United States Patent
Miller

(10) Patent No.: US 9,811,879 B2
(45) Date of Patent: *Nov. 7, 2017

(54) KEEPING MAP LABELS CONSISTENT ACROSS MULTIPLE ZOOM LEVELS

(71) Applicant: GOOGLE INC., Mountain View, CA (US)

(72) Inventor: Andrew Miller, Seattle, WA (US)

(73) Assignee: GOOGLE INC., Mountain View, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/540,426

(22) Filed: Nov. 13, 2014

(65) Prior Publication Data

US 2015/0070397 A1   Mar. 12, 2015

Related U.S. Application Data

(63) Continuation of application No. 13/279,465, filed on Oct. 24, 2011, now Pat. No. 8,896,630.

(51) Int. Cl.
| | |
|---|---|
| *G09G 5/00* | (2006.01) |
| *G06T 3/40* | (2006.01) |
| *G06T 11/20* | (2006.01) |
| *G01C 21/36* | (2006.01) |
| *G09B 29/00* | (2006.01) |

(Continued)

(52) U.S. Cl.
CPC ............. *G06T 3/40* (2013.01); *G01C 21/367* (2013.01); *G01C 21/3673* (2013.01); *G06T 11/20* (2013.01); *G09B 29/006* (2013.01); *G09B 29/106* (2013.01); *G06F 3/14* (2013.01); *G09G 5/00* (2013.01); *G09G 2340/0407* (2013.01); *G09G 2340/14* (2013.01)

(58) Field of Classification Search
None
See application file for complete search history.

(56) References Cited

U.S. PATENT DOCUMENTS

| | | | |
|---|---|---|---|
| 5,864,632 A | 1/1999 | Ogawa et al. | |
| 6,565,610 B1 * | 5/2003 | Wang | G06T 11/60 345/619 |

(Continued)

OTHER PUBLICATIONS

Bing Maps AJAX Control, Version 7.0 (2011).

(Continued)

*Primary Examiner* — Kyle Zhai
(74) *Attorney, Agent, or Firm* — Marshall, Gerstein & Borun LLP

(57) ABSTRACT

A computer server prepares application-specific map data responsive to a request from a client device. The application-specific map data includes map feature data and label data which itself includes information that specifies one or more zoom levels for which the label information is appropriate to display. When generating the label data, a type table that designates label style information by feature type and by zoom level may be used at the server. The map feature data may also include a relative rank for each feature that is passed to its corresponding label. The display order allows the map client, when generating the map, to select the most appropriate labels to display when the display of all possible labels would cause clutter or otherwise violate label display rules.

12 Claims, 7 Drawing Sheets

(51) Int. Cl.
*G09B 29/10* (2006.01)
*G06F 3/14* (2006.01)

(56) References Cited

U.S. PATENT DOCUMENTS

| | | |
|---|---|---|
| 7,734,412 B2 | 6/2010 | Shi et al. |
| 2004/0030493 A1 | 2/2004 | Pechatnikov et al. |
| 2005/0285876 A1 | 12/2005 | Balaga et al. |
| 2008/0077558 A1 | 3/2008 | Lawrence et al. |
| 2008/0109159 A1 | 5/2008 | Shi et al. |
| 2008/0148175 A1* | 6/2008 | Naaman .............. G06F 17/3087 715/781 |
| 2008/0231643 A1 | 9/2008 | Fletcher et al. |
| 2009/0182500 A1 | 7/2009 | Dicke |
| 2009/0263026 A1 | 10/2009 | Verne et al. |
| 2011/0231872 A1 | 9/2011 | Gharachorloo et al. |

OTHER PUBLICATIONS

Bing Services, "Getting Started with V4 of the API (Part 1)," Microsoft (2011). Retrieved from the Internet on Sep. 26, 2011: URL:http://msdn.microsoft.com/en-us/library/aa907678.aspx.

Neoseeker, "Bing Maps Combines Raster Tiles and Vector Graphics for Enhanced Experience," Neo Era Media Inc. (1999-2011). Retrieved from the Internet on Sep. 26, 2011: URL:http://www.neoseeker.com/news/14507-bing-maps-combines-raster-tiles-and-vector-graphics-for-enhanced-experience.

Sample et al., "Tile-Based Geospatial Information System: Principles and Practices," pp. xi-xiv, 193-203 (Springer 2010).

Office Action issued in U.S. Appl. No. 13/279,465, dated Mar. 13, 2014.

Office Action issued in U.S. Appl. No. 13/279,465, dated Jul. 2, 2014.

* cited by examiner

KEEPING MAP LABELS CONSISTENT ACROSS MULTIPLE ZOOM LEVELS

CROSS-REFERENCE TO RELATED APPLICATIONS

This application is a continuation of and claims priority to U.S. application Ser. No. 13/279,465, filed on Oct. 24, 2011, entitled "Keeping Map Labels Consistent Across Multiple Zoom Levels," the entire disclosure of which is hereby expressly incorporated by reference herein.

FIELD OF TECHNOLOGY

The present disclosure relates to image rendering systems, such as electronic map display systems, and more specifically to the use a table of feature data organized by zoom level for placing label and other feature information when changing zoom levels.

BACKGROUND

Digital maps are found in and may be displayed by a wide variety of devices, including mobile phones, car navigation systems, hand-held GPS units, computers, and many websites. Although digital maps are easy to view and to use from an end-user's perspective, creating a digital map is a difficult task and can be a time-consuming process. In particular, every digital map begins with storing, in a map database, a set of raw data corresponding to millions of streets and intersections and other features to be displayed as part of a map. The raw map data that is stored in the map database and that is used to generate digital map images is derived from a variety of sources, with each source typically providing different amounts and types of information. This map data must therefore be compiled and stored in the map database before being accessed by map display or map rendering applications and hardware.

There are, of course, different manners of digitally rendering map images (referred to as digital map images) based on map data stored in a map database. One method of rendering a map image is to store map images within the map database as sets of raster or pixelated images made up of numerous pixel data points, with each pixel data point including properties defining how a particular pixel in an image is to be displayed on an electronic display device. While this type of map data is relatively easy to create and store, the map rendering technique using this data typically requires a large amount of storage space for comprehensive digital map images, and it is difficult to manipulate the digital map images as displayed on a display device in very many useful manners.

Another, more flexible methodology of rendering images uses what is traditionally called vector image data. Vector image data is typically used in high-resolution and fast-moving imaging systems, such as those associated with gaming systems, and in particular three-dimensional gaming systems. Generally speaking, vector image data (or vector data) includes data that defines specific map objects or elements (also referred to as primitives) to be displayed as part of an image via an image display device. In the context of a map image, such map elements or primitives may be, for example, individual roads, text labels, areas, text boxes, buildings, points of interest markers, terrain features, bike paths, terrain or street labels, etc. Thus, for any particular image element, the map database stores a set of various attributes defining properties of the element.

During the image rendering process, a client mapping engine takes the primitives to generate a set of shapes using one or more technologies such as Open GL. The use of vector graphics can be particularly advantageous in a mobile map system in which image data is sent from a centralized map database via a communications network (such as the Internet, a wireless network, etc.) to one or more mobile or remote devices for display. In particular, vector data, once sent to the receiving device, may be more easily scaled and manipulated (e.g., rotated, etc.) than pixelated raster image data. However, the processing of vector data is typically much more time consuming and processor intensive on the image rendering system that receives the data.

In the case of both rasterized map images and vector data generated images, text or other legend symbols, such as those used to label streets, roads and other features of a map, may be downloaded and displayed. The labels are generally placed on or proximately near to a map object for which the label identifies or provides information. Generally, each time a zoom level of a computerized map is changed or adjusted, labels may be downloaded and redrawn.

SUMMARY

A method for providing map label data across a range of zoom levels is provided. The method includes, obtaining a type table that specifies by feature type, first label style information for a first range of zoom levels and second label style information for a second range of zoom levels, wherein the first label style information is different from the second label style information. The method further includes receiving a request for map data from a client computing device, wherein the map data includes a map feature having a feature type and corresponding label data and in response to the request, generating label data including label text, the first label style information, and the first range of zoom levels for which the label data is valid according to the particular feature type in the type table corresponding to the label data, and transmitting map feature data and the label data to the client computing device.

A method of operating a client device includes receiving, via a user interface, an instruction to display map data, transmitting a message requesting map data device to a server via a communication network, and receiving, from the server, map data including map vector data for map features and label data including label text, first label style information, and a first range of zoom levels for which the label data is valid according to a particular feature type in a type table corresponding to the label data, wherein the type table specifies style information by feature type including the first label style information for the first range of zoom levels and second style information for a second range of zoom levels, and wherein the first label style information is different from the second label style information. The method further includes selecting, for a given zoom level, label data with a range of zoom levels for which the label data is valid that encompasses the given zoom level, and displaying the map vector data and the label text from the selected label data using the label style information for the given zoom level.

A computing device includes a communication interface, a user interface, one or more processors coupled to the communication interface and the user interface and a non-transitory computer-readable memory coupled to the one or more processors and storing instructions thereon. When executed by the one or more processors, the instructions cause the computing device to receive, via the user interface, an instruction to display map data, transmit a message requesting map data to a server via the communication interface, and receive map data including map vector data for map features and label data including label text, first label style information, and a first range of zoom levels for which the label data is valid according to a particular feature type in a type table, wherein the type table specifies style information by feature type including the first label style information for the first range of zoom levels and second style information for a second range of zoom levels, and wherein the first label style information is different from the second label style information. The instructions further cause the computing device to select, for a given zoom level, label data with a range of zoom levels for which the label data is valid that encompasses the given zoom level, and display the map vector data and the label text from the selected label data using the label style information for the given zoom level.

DETAILED DESCRIPTION

Figure 1:
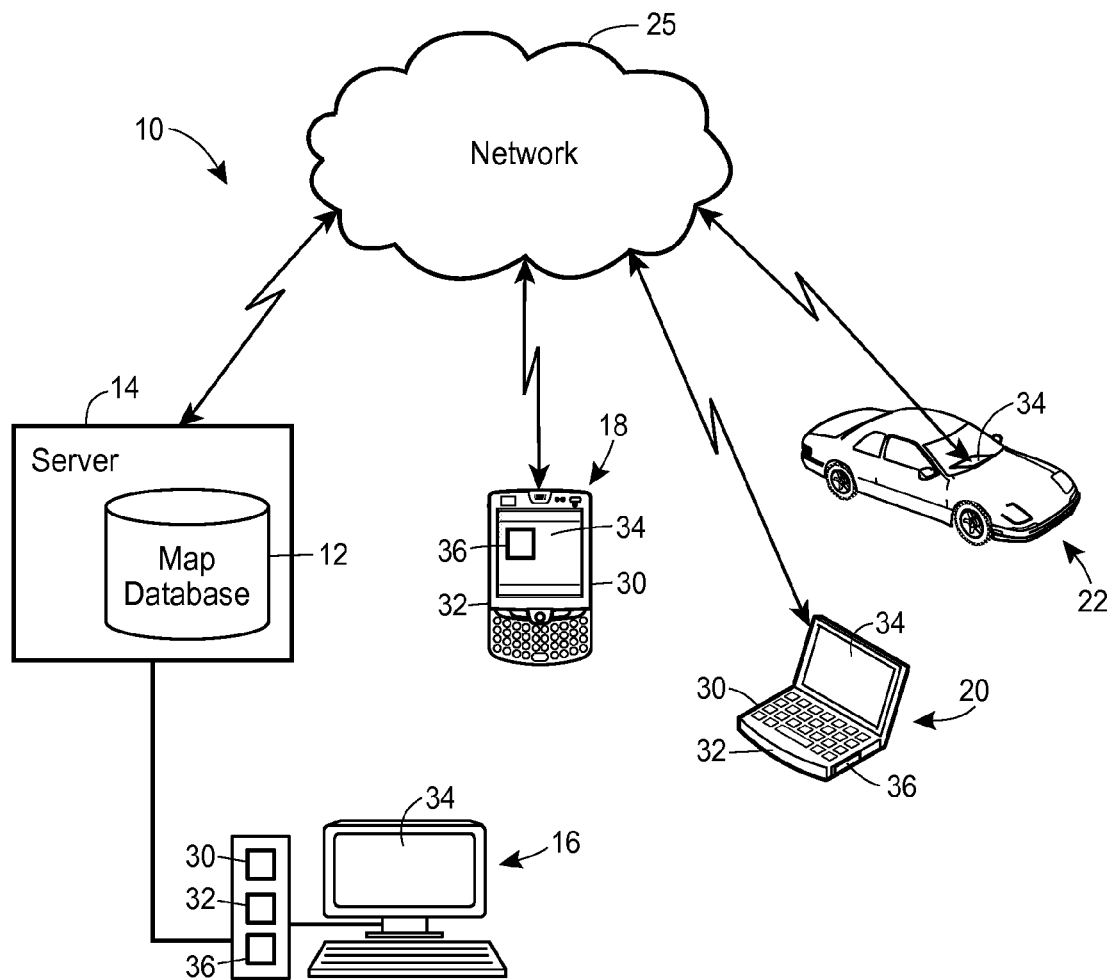
FIG. 1 is a high level block diagram of a map imaging system that implements communications between a map database stored in a server and one or more map image rendering devices.

A graphics or image rendering system, such as a map image rendering system, receives image data from an image database in the form of vector data that defines various features of the map, such as roads, boundaries, etc., in addition to text strings or symbols to be displayed with the features to provide, for example, labels for the features.

Conceptually, a map at the lowest zoom level fits the entire contents of the available map region on a display. For example, a world map at zoom 0 would show the entire Earth using some known projection technique. A conceptual description of this full image is a map tile, or simply, a tile. For the sake of illustration, assume the tile is a square, although other shapes are possible and, in some cases, part of the tile may be outside a viewing window of a particular display.

Zooming in causes, in some embodiments, replacing the initial single tile with four tiles covering the area of the first tile. Zooming in continues through successive zoom levels at a geometric progression with each tile being replaced by four tiles until a fixed limit is reached or a practical minimum for a given application is reached. For example, there is little reason for a street map application to show less than a width of a street.

While map data may be stored in a database or backend system in discrete zoom levels, a map rendering system does not particularly operate on a strict data-per-zoom level basis, particularly a vector-based map system. Because many, if not all, map features may be vector based, that is, described geometrically instead of bitmapped or raster images, discrete zoom levels becomes less obvious. A particular feature, for example, a road described by its centerline and width may be downloaded at a given zoom level and used over several zoom levels or until the feature moves out of view.

In addition to map image or vector data, additional information such as labels or symbols may be stored in the map database and downloaded to the client device to be displayed with corresponding features to provide labels for the features, additional information about a feature, etc. As above, scalable fonts such as those used in a page description language can also be applied over a range of zoom levels.

Label positioning techniques generally determine an approximate center of a feature being rendered (such as a road segment, a river segment, a lake, a building, etc.) and anchor the labeling process by placing a label at the determined center. Based on a set of rendering parameters and feature parameters, the map image rendering system determines whether additional labels can be placed at a certain distance from the approximate center in one or more directions away from the center. Generally, if too many labels are placed on the map, the map data may become obscured and the map appears cluttered. On the other hand, if too few labels are placed, the viewer may have a more difficult time getting oriented on the map.

As zoom levels decrease and larger geographic areas are presented at a smaller scale, only the most prominent features may be labeled, such as a significant landmark or city center. As zoom levels increase, the amount of detail increases and smaller features, such as side streets and individual stores, may be labeled. Each time map image or vector data is received for a new zoom level, new label data may also be downloaded. Redisplaying label data at each zoom level can cause the displayed label to flash as the old label is removed and a new label is redrawn. If the new label is redrawn at a different location, the label may appear to crawl across the display window. Rules that help prevent obscuring map data and that limit clutter may limit the number of labels or other information to less than that supplied with the map data. Redrawing each label, sometimes at new locations, and determining whether or not to display the label can use valuable processor resources and have unpleasant visual side effects.

To guide the map engine or image rendering process with respect to label display, each label may include a zoom level range over which it may be used without re-downloading or redrawing. Additionally, each feature may include a rank for its associated label. The rank sets the relative importance of the label with respect to other labels and is used by the map engine to determine which labels to display and which labels to defer at the current zoom level and view.

In order to make the zoom process more efficient, a type table at the map server may identify styles for various feature types or labels, by zoom level. In the type table, a particular feature type may have a style definition that calls for one font/size/color for a first range of zoom levels and another font/size/color for a second range of zoom levels, etc., for all the zoom levels supported for that feature type.

The type table is then used to generate map data for a client request, where the map data includes label data with both label text and additional information specifying a range of zoom levels over which that label can be used.

Not only does this allow multiple labels to be treated as a group, but it allows a map designer to predetermine certain map display criteria at the feature type level. At least one effect is to allow a local map rendering engine to perform functions such as zoom level changes more efficiently. When label data is generated, the feature type is used to set a zoom range for the label and the label data downloaded to a client includes zoom range information.

Different applications use different types of data. For example, a driving-direction application has different feature data requirements than a terrain map. Additionally, some geographic areas have rich geometric and feature data so that new data is available at each zoom level. Generally, a default zoom level has no new geometric information over a span of zoom levels, for example, zoom levels 14-16 may use the same map vector data. However, each zoom level may display different labels. The use of the type table when building label data for selected levels allows the user to zoom within the range specified and display zoom-level designated labels by feature type without downloading new text strings and/or symbols as the zoom level changes. Alternatively, even if new label data is received, the mapping application may reuse already displayed label information if the difference between the currently displayed information and new information is not significant enough to warrant an update. If the zoom level changes beyond the range indicated in the type table, new tiles with new map features, new label data, or both, can be downloaded and used.

Because the type table contains information on feature types by zoom level and does not include label or map feature data, the type table may be independent of either the label or map feature data associated with a specific tile. The type table may include information for feature types on a regional basis even though a current map tile may not include that particular feature type.

The type table may be application-specific. That is, different applications may have different type tables specifying different ranges of zoom levels for one or more specific feature types, or may include different feature types, etc.

Referring now to FIG. 1, a map-related imaging system 10 includes a map database 12 stored in a server 14 or in multiple servers located at, for example, a central site or at various spaced apart sites, and also includes multiple map client devices 16, 18, 20, and 22, each of which stores and implements a map rendering device or a map rendering engine. The map client devices 16-22 may be connected to the server 14 via any hardwired or wireless communication network 25, including for example a hardwired or wireless LAN, MAN or WAN, the Internet, or any combination thereof. The map client devices 16-22 may be, for example, mobile phone devices (18), computers such a tablet, pad, laptop, desktop or other types of computers (16, 20) or components of other imaging systems such as components of automobile navigation systems (22), etc. Moreover, the client devices 16-22 may be communicatively connected to the server 14 via any suitable communication system, such as any publically available or privately owned communication network, including those that use hardwired based communication structure, such as telephone and cable hardware, and/or wireless communication structure, such as wireless communication networks, including for example, wireless LANs and WANs, satellite and cellular phone communication systems, etc.

The map database 12 may store any desired types or kinds of map data including raster image map data and vector image map data. However, the image rendering systems described herein are best suited for use with vector image data which defines or includes a series of vertices or vertex data points for each of numerous sets of image objects, elements or primitives within an image to be displayed. Generally speaking, each of the image objects defined by the vector data will have a plurality of vertices associated therewith and these vertices will be used to display a map related image object to a user via one or more of the client devices 16-22.

As will also be understood, each of the client devices 16-22 includes an image rendering engine having one or more processors 30, one or more memories 32, a display device 34, and in many cases a rasterizer or graphics card 36 which are generally programmed and interconnected in known manners to implement or to render graphics (images) on the associated display device 34. The display device 34 for any particular client device 16-22 may be any type of electronic display device such as a liquid crystal display (LCD), a light emitting diode (LED) display, a plasma display, a cathode ray tube (CRT) display, or any other type of known or suitable electronic display.

Generally speaking, the map-related imaging system 10 of FIG. 1 operates such that a user, at one of the client devices 16-22, opens or executes a map application (not shown in FIG. 1) that operates to communicate with and to obtain map information or map related data from the map database 12 via the server 14, and that then displays or renders a map image based on the received map data. The map application may allow the user to view different geographical portions of the map data stored in the map database 12, to zoom in or zoom out on a particular geographical location, to rotate, spin or change the two-dimensional or three-dimensional viewing angle of the map being displayed, etc. More particularly, when rendering a map image on a display device or a display screen 34 using the system described below, each of the client devices 16-22 downloads map data in the form of vector data from the map database 12 and processes that vector data using one or more image shaders to render an image on the associated display device 34.

More than one type of mapping application may be available on a client device. For example, one mapping application may be tailored to terrain maps and another may be tailored to turn-by-turn directions, etc. When sending a message requesting map data from the map server 14, the client device may include an identifier that indicates which mapping application is associated with the request. The map server 14 may then tailor the map data and corresponding label data to that mapping application. In doing so, the mapping application may avoid downloading and storing map data and label data that are not supported by the map application.

Figure 2:
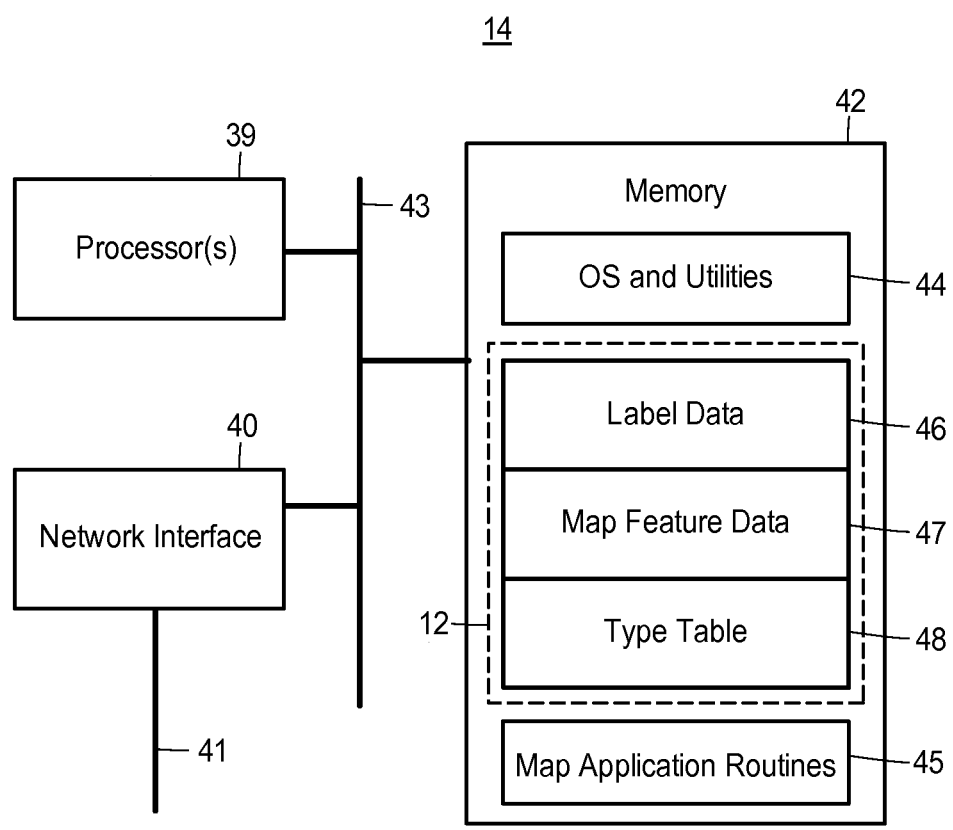
FIG. 2 is a high level block diagram of a computer server supporting map applications.

Referring now to FIG. 2, an exemplary server 14, such as server 14 of FIG. 1, includes a processor 39, a network interface 40 connecting the server 14 to an external network 41 and a memory 42. The processor 39 may, in practice include more than one processor or the server 14 itself may be an arrangement of servers, such as interconnected blade servers. The processor 39, network interface 40, and memory 42, as well as other components common to a server and not illustrated, may be connected by one or more data buses 43. A number of processors and databus architectures are known and include those from well known hardware manufacturers such as Intel® and AMD®.

The memory 42 may be a combination of hardware memories, such as, RAM, ROM, solid state disks and/or rotating media and may also include both fixed and removable physical media. The memory may store both data and executable code, including but not limited to an operating system and utilities 44, the map database 12, and one or more map application routines 45. The map database may include label data 46, map feature data 47 in the form of image data, vector data, or both, and one or more type tables 48 describing style information by zoom level for feature types and associated label data. The map application routines may include those used to respond to individual client device requests for map data, as further described below.

Figure 3A:
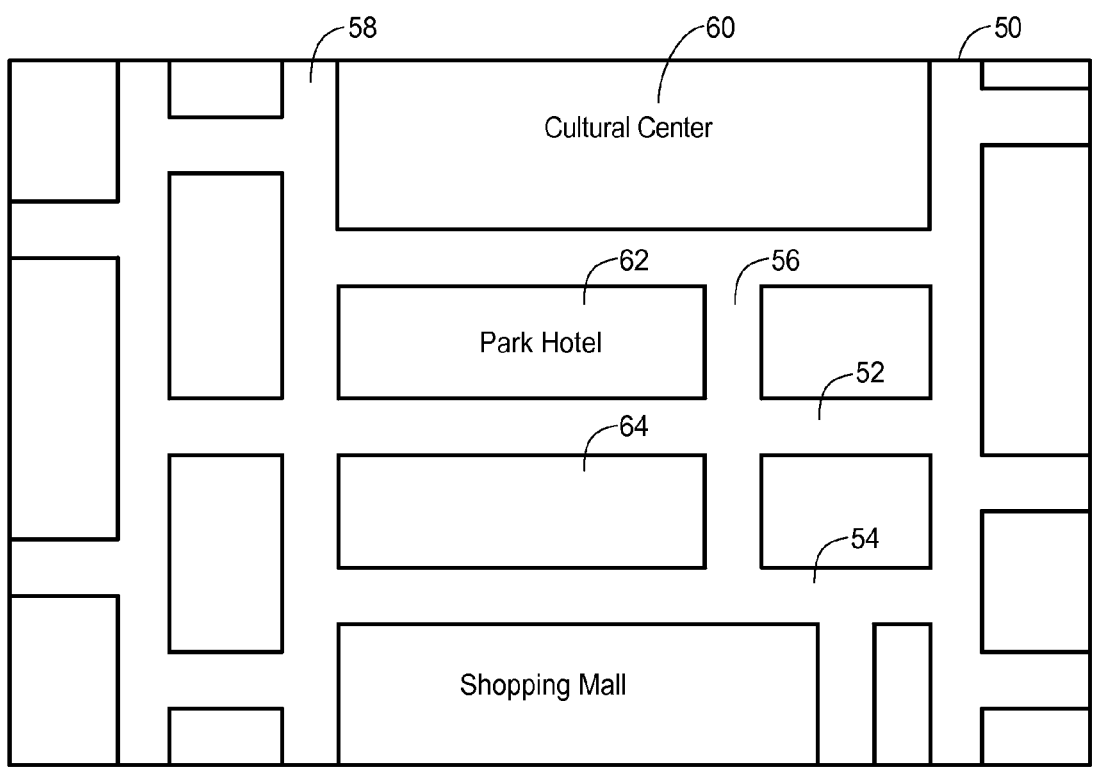
FIG. 3A is a depiction of a computer displayed map at a first zoom level showing a limited number of feature elements.
Figure 3B:
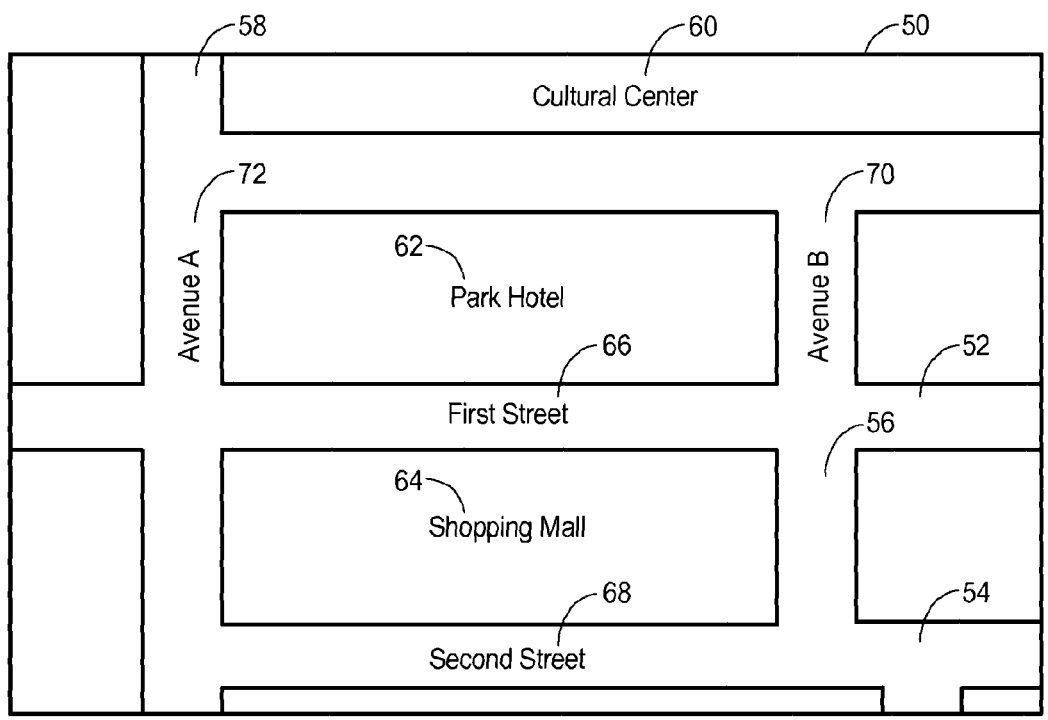
FIG. 3B is a depiction of a computer displayed map of FIG. 3A at a second zoom level showing more feature elements.
Figure 3C:
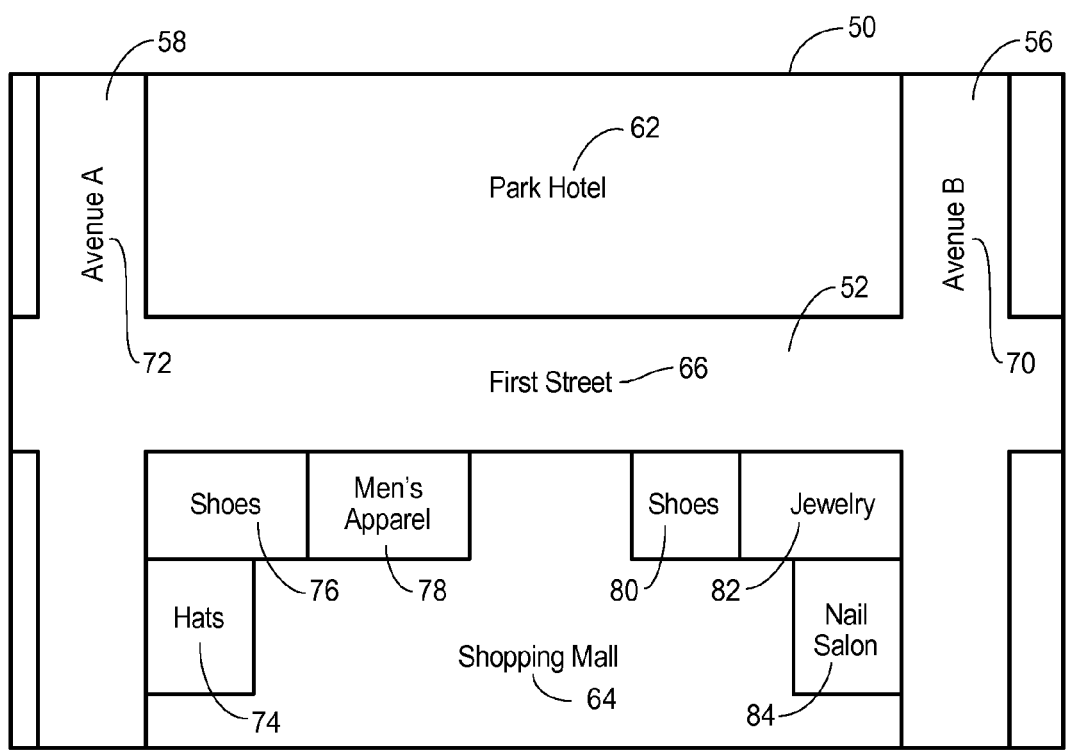
FIG. 3C is a depiction of the map of 3B at a higher zoom level showing more feature elements.

FIGS. 3A-3C illustrate exemplary map display scenarios which will be referred to with respect to a discussion of the use of type tables for label data generation and display.

As illustrated in FIG. 3A, a portion of an exemplary urban area is shown in a viewing window 50. Streets 52, 54, and 56 are shown in their entirety, and a portion of street 58 is also shown, among others. At this zoom level, street names are not displayed. Building identifiers for selected buildings are also shown in this example, specifically 'Cultural Center' 60, 'Park Hotel' 62, and 'Shopping Mall' 64.

Map features, such as streets, generated from vector image data, in some embodiments, may be used in generating maps at more than one zoom level. For example, vector image data downloaded for a map zoom level 14 may also be used for map zoom levels 15 and 16. Alternatively, map feature label data may be received for each new zoom level, either with new map vector data or may be received independently from map vector data.

As discussed above, label positioning rules may dictate what feature labels or details are presented at a given zoom level to present the user with a comprehensive map with enough feature labels to orient the user and still appear uncluttered.

FIG. 3B illustrates a closer zoom of the map area of FIG. 3A in viewing area 50. Portions of streets 52, 54, 56, and 58 are displayed and respective street name labels are now visible, 'First Street' 66, 'Second Street' 68, 'Avenue B' 70, and 'Avenue A' 72. Building identifiers 60, 62 and 64 are also still shown at this zoom level.

The map of FIG. 3B may be rendered using existing data stored in the data memory 43. Additional feature label data may also be stored on the client device in one or more forms and may be used to populate feature labels for more than one zoom level without requiring additional data communication with the server 14 or equivalent repository of a map database, such as map database 12 of FIG. 1.

In an embodiment, the additional feature label data may be downloaded with the map vector data and stored in a list or table of feature data. When the map vector image data is designated for multiple zoom levels, the feature label data may also be designated for that range of zoom levels. Depending on the location and density of features, the image data and feature data may not have a zoom level-to-zoom level correspondence. For example, image data may be appropriate only for two zoom levels but the feature label data may only have information for one of the supported zoom levels. Conversely, the feature label data may have information for more zoom levels than are currently displayed. That is, the one set of vector image data may be used to provide image data for three zoom levels and the feature label data may have individual labels designated for separate display at only one of the three zoom levels. For example, map vector data may cover zoom levels 17-19 and label data covering that range as well. However, the accompanying label data may also have labels that display only at zoom level 17, only at zoom level 18, and only at zoom level 19, or some combination such as 17-18 only or 18-19 only. This allows full featured zooming over the range without extra round trips to the server.

Not every label in the label data will necessarily be shown on the viewing window 50. For example, the user may position the viewing window 50 over the image data in such a way that the display of every feature label could cause labels to overlap or cause the label to obscure a map feature, or otherwise not meet rules applicable for label presentation in the viewing window 50.

As illustrated in FIG. 3C, viewing window 50 displays a smaller area of the map of FIGS. 3A and 3B at a higher zoom level and shows a greater resolution of details of the map. In this case, the zoom level of the viewing window corresponds to a higher magnification than the zoom level of FIG. 3B so that a scale ratio (viewing window length over actual map distance) of FIG. 3C is larger than that of 3B. As illustrated in FIG. 3C, street features 52, 56, and 58 are shown as well as their corresponding label data, 66, 70, and 72. The feature labels "Park Hotel" 66 and "Shopping Mall" 64 are also shown in FIG. 3C. Because the feature associated with label "Cultural Center" 62 is no longer shown in the viewing area 50 its corresponding feature label is not shown. FIG. 3C also illustrates additional text and map image information not shown at previous zoom levels. For example, store outlines in the shopping building are shown and are labeled by store type in this illustration. FIG. 3C shows exemplary stores labeled "Hats" 74, "Shoes" 76, "Men's Apparel" 78, "Shoes" 80, "Jewelry" 82, and "Nail Salon" 84. Obviously, other feature labels may be used that show, for example, brand names, etc. The store outlines may be image vector data shown only at this zoom level, or may be part of new image vector data downloaded for this zoom level.

Figure 4:
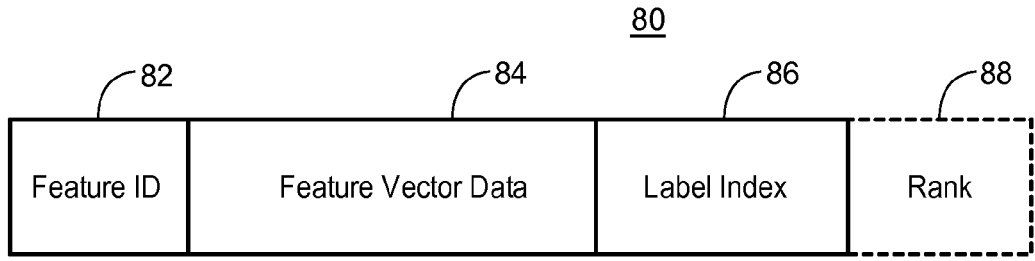
FIG. 4 illustrates a possible record of map vector data.

Map vector data for a feature, such as a building, may include a label reference to a corresponding label. FIG. 4 illustrates a possible record 80 of map vector data for a map feature. The record 80 may include a feature identifier 82 used by the map client, feature vector data 84, and a label index 86, used to locate the label data for this feature. The record 80 may also include a rank 88, as shown in FIG. 4 in dashed outline. The rank may be linked to the label data and used by the map client to determine what labels to display when not all labels can be displayed based on display rules.

Figure 5:
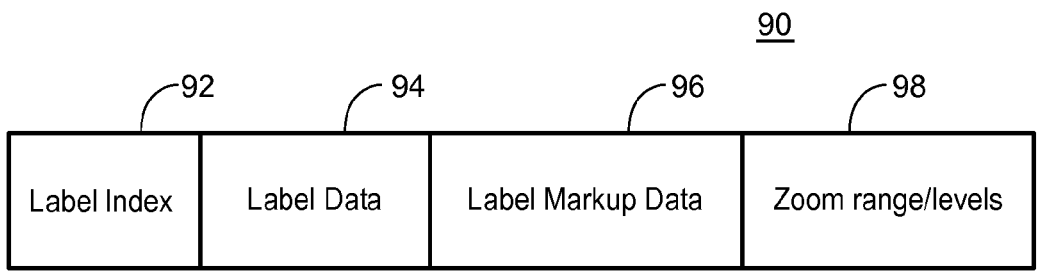
FIG. 5 illustrates a possible record of label data showing its relationship to the map vector data of FIG. 4.

Correspondingly, as shown in FIG. 5, a label record 90 of feature label data may include a label index 92 corresponding to label reference 86 of FIG. 4 so the label record 90 can be identified during the display process. Feature label data 94 may be the label text or may be a binary symbol, such as a bitmap. The label record 90 may include label markup data 96, for example, font, color, and size when the label is text. The zoom range/levels field 98 indicates for which zoom levels use of the label is appropriate. As discussed below, there are circumstances when a label may be used outside of the designated zoom range. The zoom range or levels 98 may reflect information found in a type table on the server 12 that designates style or markup information about a particular label, as well as what zoom levels to which a particular style applies.

More or less information may be included in the record 80 of map vector data and the label record 90. In an embodiment, the map feature data and label information may be in the same record, or the label data could be sent with an independent position, eliminating the need for a linking index 86/92. Further, these records may be in formats other than a simple record as shown in FIGS. 4 and 5. For example, both data sets may be a single binary object, compressed or uncompressed, or may be downloaded as multiple separate objects and linked through other referencing methods.

When displaying map labels, there may be times when new feature label data is downloaded, in conjunction with or separately from map vector data. Displaying the new label over an existing label having the same content (e.g., the same text), may cause the label to appear to blink as the old label is removed and the new label is displayed in the same place. In some cases, the new label may be a different size, which may contribute to the blinking effect. Recognizing that a small change in font size may not have an effect on map readability, but that the associated blink could be a distraction, the map architect can designate when to keep an existing label even when a new label may be available.

This allows a map designer to set up styles for maps on a feature-type basis but still allow for some flexibility. If a style rule sets city labels for zoom levels 4-6 at a 10 point font and between zoom levels 7-10 as a 12 point font, then when passing the boundary from zoom level 6 to zoom level 7, new labels are probably appropriate. However, when zooming, if a style change from 10 point font to 10.5 point is indicated, a map engine may have the discretion to reuse the label at the existing font to avoid possible blinking or crawling associated with re-instantiating the label at the new font size. These exceptions by design may be incorporated in the map feature information or in the label data itself or may be part of the map rendering application.

When large changes in zoom level occur, for example, from zoom level 4 to level 16, at least some new feature labels may be appropriate. However, when changing from level 15 to 16, some, or all, feature labels visible at level 15 may be reused at level 16. The decision as to whether to reuse a feature label can be made at several points in the map design and display process, but in one embodiment, the use of a type table allows a map designer to designate the display and reuse of labels by zoom level by feature type. As discussed above, designation of the display and reuse of label data by feature type may be more efficient than such designation at the individual feature or label level.

Table 1, below, illustrates one possible embodiment of a type table that may be used at a map server for generating label data. The exemplary type table shown in FIG. 1 may include an application identifier, and individual information for feature type, minimum zoom level, maximum zoom level and style. These elements are discussed below.

'Feature Type' illustrates possible designations of feature types such as building names, street names, city names, and city designators (e.g., 'City dot 1'), university, etc. These feature types are simply illustrations and other feature types are possible. As well, the exemplary information in Table 1 is shown as human readable. In practice, other data formats are possible, both for transmission size and/or indexing speed reasons.

A zoom level minimum designation indicates when a label corresponding to this feature type can be shown. A zoom level maximum designation indicates a zoom level beyond which that label type should no longer be reused. The Style column indicates the style of the text to be displayed. The designation may be by font, size, color, etc., as shown, for example, with respect to 'store name,' indicating it should be displayed at zoom levels 16-19 with Times New Roman 10 point font, in italics. Alternatively, the style may be designed by a pre-defined template, such as 'Normal' or 'Heading 1.' For example, 'Normal' may be predefined to be Arial 11 point font, black, no italic, no bold.

Alternatively, a type table may include a designation of a span of contiguous zoom levels over which labels for a feature type may be reused. For example, when data generated and sent a given zoom level, a reuse range of 3 may indicate that labels for a particular feature type may be reused over the current level plus and minus one level.

Referring to Table 1 and FIG. 3A, an example of using a type table is discussed. Assuming FIG. 3A shows a map at zoom level 14, Table 1 shows that feature labels associated with a feature type of 'Building name' are displayed at zoom level 14 and may be reused to zoom level 16. FIG. 3A illustrates the building names are displayed. FIG. 3B, simulating the map of FIG. 3A at zoom level 15, illustrates that per Table 1 the street names are displayed and the building names are displayed and reused from zoom level 14. FIG. 3C, simulating the map of FIG. 3A at zoom level 16, illustrates that per Table 1 the store names are displayed and the building names and street names are displayed and reused from levels 14 and 15, respectively.

Note that zooming to level 17 would require a refresh of the building name feature type, just as either city name or city dot (city center indicator) feature types need to be refreshed at each level shown in FIGS. 3A-3C. In the examples of FIGS. 3A-3C, no feature labels associated with the city name and city dot feature types are shown because their use is specified at zoom levels not currently in use.

Table 2 illustrates another possible embodiment of a type table for a different application. Table 2 illustrates that other applications may have different feature types and may cover different zoom levels.

TABLE 1

Application: Street level

| Feature Type | Zoom level min | Zoom level max | Style |
|---|---|---|---|
| Building name | 14 | 16 | Heading 1, red |
| Street name | 15 | 17 | Normal |
| Store name | 16 | 19 | TNR, 10 pt, italic |
| City name 2 | 12 | 13 | Large dot icon, Arial 12 pt |
| City name 1 | 10 | 11 | Small dot icon, Arial 12 pt |

TABLE 2

Application: Terrain

| Feature Type | Zoom level min | Zoom level max | Style |
|---|---|---|---|
| River | 16 | 19 | Normal |
| River | 13 | 15 | Heading 1 |
| Mountain | 16 | 19 | Normal |
| Mountain | 8 | 15 | Heading 1 |
| Street names | 16 | 16 | Heading 2 |
| Border | 0 | 8 | Weight 4 |
| Border | 9 | 19 | Weight 7 |

The 'application' field may designate the application for which a particular type table is applicable. For example, feature label display and reuse may be different for a terrain application compared to a driving direction application.

The exemplary format and data of Tables 1 and 2 does not encompass every type of data applicable to every mapping application or every format for receiving label data. For example, a turn-by-turn directions application may have different labels and/or symbols, such as turn arrows, etc. Further, map feature data, in any format, may be customized for the application currently running, or may have additional data related to applications not currently running, in anticipation of a user traversing from one to another, such as from street view to driving directions. Additional information could be captured in, for example, another record entry or simply included as additional data in a binary file. Actual label text may be included with the map feature data or may be sent separately and associated with a particular map feature using an index.

Figure 6:
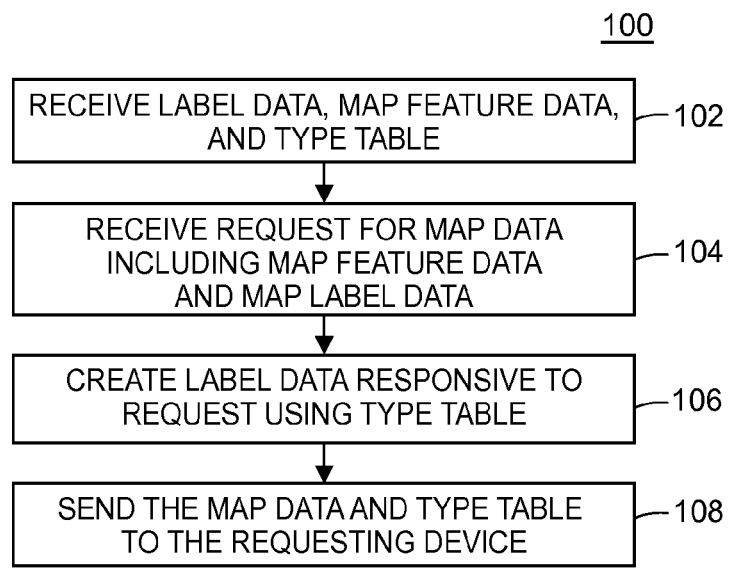
FIG. 6 illustrates a method of preparing a type table and related information.

FIG. 6 illustrates a method 100 of using a type table at a server device to assemble label data to send to a client device. A block 102 may receive, at the map server, label data, map feature data and a type table. Label data may be shared across applications, such as satellite or street views, while map vector data or map image data, and the type table may be application specific. However, label data may also be application specific.

The label data may be stored in the map database 12 and associated with map vector data that may also be stored in map database 12. The feature types may include a park feature type, a street feature type, a city feature type, or a country feature type. Obviously, other feature types are both possible and expected when considering the variety of map information and map types available from many sources.

A block 104 may receive a request over a network 25 for map data from a client device requesting such data, such as client devices 16, 18, 20, and 22 of FIG. 1. The map data may include map feature data and label data, where the map feature data is categorized by feature type and the label data is indexed to corresponding map features. The request for map data may include an identification of map application type. In some applications the label data is text data.

A block 106 may create, at the server device 14, label data, such as the label data illustrated in FIG. 5. The label data may include one or more zoom levels at which to display the label data, which may be linked to a particular feature type. For a given feature, a rank may be designated, where the rank specifies a relative importance used to order which to add labels until a threshold of labels is displayed. The type table may include a minimum zoom level and a maximum zoom level for a feature type that respectively specifies i) at which zoom level label data for that feature type is available for display and ii) a zoom level above which label data for that feature type must be refreshed, that is, new data must be downloaded from the server device 14. Creating the label data is a process of incorporating the style and zoom ranges from the appropriate type table. The zoom level designations may also include only those ranges of zoom levels supported by the map application type or those zoom levels corresponding to a range of zoom levels supported by the map data.

A block 108 may send the map data, including the map feature data and the label data to the computer device 16, 18, 20, 22 for use by the computer device 16, 18, 20, 22 in displaying the map feature data and label data.

Figure 7:
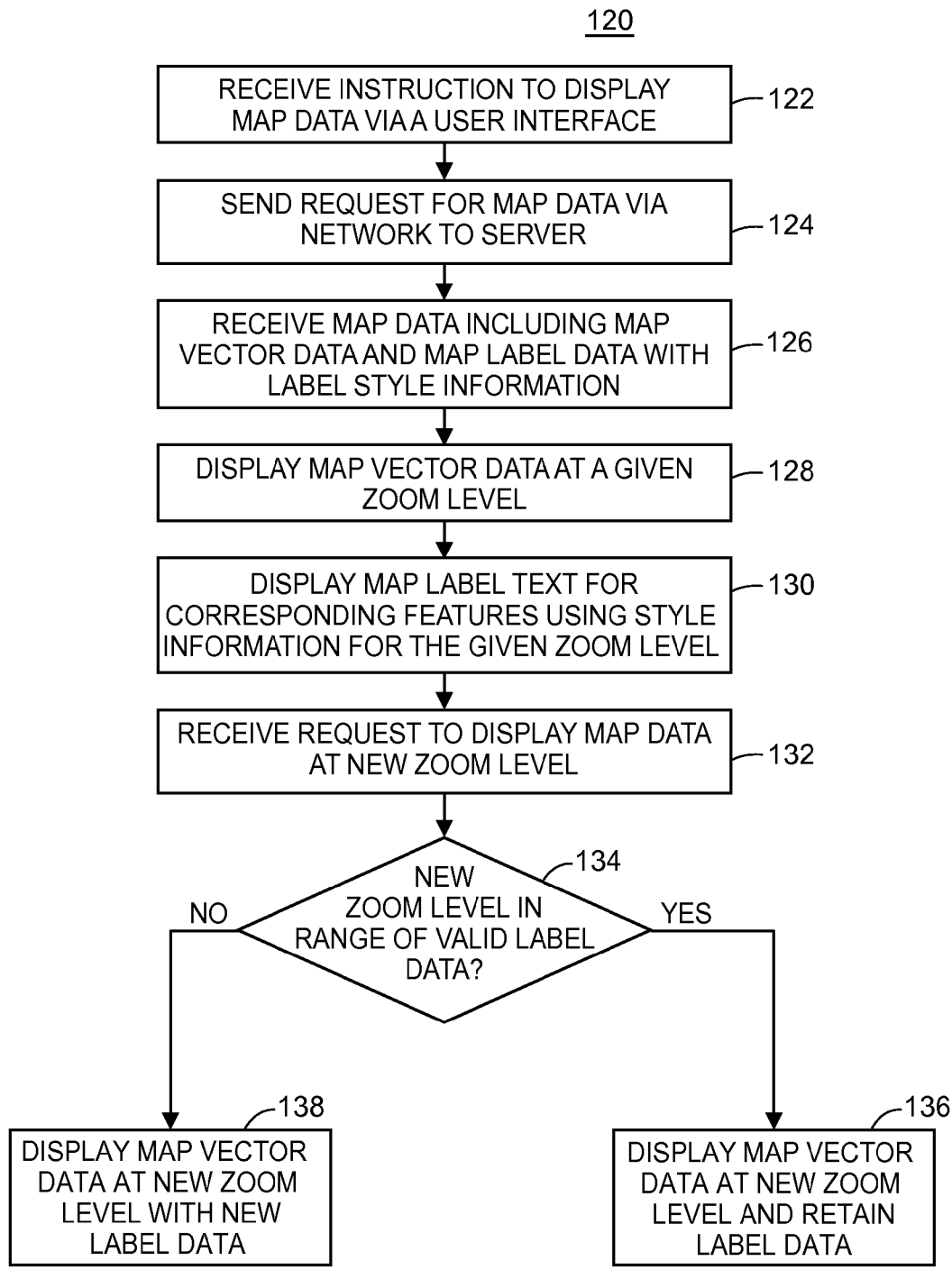
FIG. 7 illustrates a method of operating a mapping application using feature label information at a client device.

FIG. 7 illustrates a method 120 of operating a mapping application using feature label information at a client device, such as any computer device 16, 18, 20, 22, typically operated by an end-user or consumer. A block 122 may receive instructions from a user to display map data, typically when using or starting a mapping application. The instructions may be received via a user interface, although in some instances the mapping application may be triggered via another event.

The client device may send a message requesting map data to a server 14 via a network 25 at a block 124. The request for map data may occur as a map application starts and initial data is requested, or may be a request subsequent to some use, when the map application needs new information related to pan or zoom operations. Processing of the request at the server 14 is discussed above. In an embodiment, sending the message requesting map data may include sending an identifier for the map application associated with the message. The server 14 may then adjust the map data so that the label data included in the map data is applicable only to features supported by the mapping application.

A block 126 may receive the map data. The map data may include both map vector data and map label data, or simply, label data. The map vector data may be used to render map features on a display. The label data may include label text, label style information, and a range of zoom levels for which the label data is valid. In an embodiment, the label text may be indexed by feature type. For example, in a hiking map application, a feature type of 'trail' may be used to index label text associated with trails.

A block 128 may display the map vector data at a given zoom level. The zoom level may be a default zoom level, as when the map application is starting up, or the zoom level may be displayed according to user instructions.

A block 130 may display the label text corresponding to displayed map features using the label style information for the given zoom level. For example, a particular feature, such as a road, may have a text label of 'First Street.' Accompanying label style information may describe the font type and font size for the label and may include a range of zoom levels for which the label is valid. In an embodiment, the style information may be zoom-level by zoom-level, and the range of zoom levels for which the style information is valid may be inherent in the articulation of styles by zoom level. In another embodiment, the zoom levels for which the style information is valid may be expressly stated and the style information is common across those zoom levels.

When displaying dense map vector data, particularly on a relatively small display, the available label text may be so voluminous that displaying all the label text could significantly obscure the map features. To address this situation, each map feature may include a rank specifying a relative order in which to add labels until a threshold of labels is displayed. That is, the mapping application may apply labels in order of rank until some threshold is reached, for example, percentage of display area used by label text.

A block 132 may receive a request to display the map data at a new zoom level. A block 134 may determine if the new zoom level is within the range of zoom levels for which the currently displayed label data is valid. In an embodiment, the range of zoom levels for which the label data is valid may be specified as a minimum zoom level and a maximum zoom level. In this embodiment, determining if the new zoom level is within the range of zoom levels for which the label data is valid involves evaluating whether the new zoom level is between the minimum zoom level and the maximum zoom level.

When the new zoom level is within the range of zoom levels for which the currently displayed label data is valid, the 'yes' branch may be followed from block 134 to a block 136. Block 136 may display the map data at the new zoom level and retain the currently displayed label data, that is the label text and style. By retaining the label text, and the label text's associated style, blinking associated with removing and redrawing the label are minimized and the viewer's experience may be enhanced.

At block 134, when the currently displayed label data is not valid for the new zoom level, execution may follow the 'no' branch from block 134 to a block 138. Block 138 may display the map data at the new zoom level and determine if label data appropriate to the new zoom level is present at the client device. For example, when the map data and label data originally downloaded contains label data for multiple zoom levels, the label data for the new zoom level may already be present at the client device. In this case, the new label text and/or style data may be displayed without interaction with the server 14. In one embodiment, the map vector data may be usable over, for example, four zoom levels, and the label data, including label images, label text and label style information may be included as multiple sets of label data. One set may cover the first two supported zoom levels, another may cover the third zoom level and yet another may cover the fourth zoom level. When zooming in this scenario, the map data may be used over the four zoom levels. The label data will be reused for the first two zoom levels and redrawn with new data and/or styles for the next two zoom levels. By doing so, the range of zoom levels can be displayed without additional requests made to the server. As illustrated in this embodiment, the zoom levels supported by the label data correspond to zoom levels supported by the map vector data, minimizing the delay and bandwidth required for data transactions with the server 14.

However, if the label data for the new zoom level is not at the client device, the client device may request, from the server 14, new label data for the new zoom level and use that new label data when displaying the map vector data at the new zoom level.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 25 may include but is not limited to any combination of a LAN, a MAN, a WAN, a mobile, a wired or wireless network, a private network, or a virtual private network. Moreover, while only four client devices are illustrated in FIG. 1 to simplify and clarify the description, it is understood that any number of client computers or display devices are supported and can be in communication with the server 14.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for rendering map or other types of images using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method of operating a client device, the method comprising:
   receiving, at one or more processors in a client device via a user interface, an instruction to display map data at a given zoom level;
   transmitting, by the one or more processors, a message requesting map data to a server via a communication network;
   receiving, at the one or more processors from the server, map data including map vector data for map features and label data including label text;
   receiving, at the one or more processors from the server, first label style information, a first range of zoom levels, and instructions to apply the first label style information to the label text at the first range of zoom levels, wherein the first range of zoom levels includes the given zoom level, and wherein style information includes at least one of: a font type, a font size, or a font color;
   displaying, by the one or more processors, the map vector data and the label text from the selected label data using the first label style information for the given zoom level in accordance with the instructions for the first range of zoom levels, receiving, at the one or more processors, via the user interface, an instruction to display the map data at a second zoom level within the first range of zoom levels, displaying, by the one or more processors, the map vector data and the label text from the selected label data using the first label style information for the second zoom level in accordance with the instructions for the first range of zoom levels, receiving, at the one or more processors via the user interface, an instruction to display the map data at a third zoom level outside of the first range of zoom levels, receiving, at the one or more processors from the server, second label style information, a second range of zoom levels, and instructions to apply the second label style information to the label text at the second range of zoom levels, wherein the second range of zoom levels includes the third zoom level, and wherein the second label style information is different from the first label style information, displaying, by the one or more processors, the map vector data and the label text from the selected label data using the second label style information for the third zoom level in accordance with the instructions for the second range of zoom levels, receiving, at the one or more processors, via the user interface, an instruction to display the map data at a fourth zoom level within the second range of zoom levels, and displaying, by the one or more processors, the map vector data and the label text from the selected label data using the second label style information for the fourth zoom level in accordance with the instructions for the second range of zoom levels.

2. The method of claim 1, wherein receiving the label data comprises receiving, at the one or more processors, a plurality of label data, each of the plurality of label data covering a separate range of zoom levels.

3. The method of claim 1, further comprising requesting, by the one or more processors, the second label style information from the server when the third zoom level is outside the first range of zoom levels and the second label style information is not available at the client device.

4. The method of claim 1, wherein each map feature comprises a rank specifying a relative order in which to add label text until a threshold of label text is displayed.

5. The method of claim 1, wherein transmitting the message requesting map data includes transmitting, by the one or more processors, an identifier for a mapping application associated with the message; and wherein receiving the label data includes receiving, at the one or more processors, label data applicable only to features supported by the mapping application.

6. The method of claim 1, further comprising:

generating, by the one or more processors, a data structure including for each of a plurality of label references, a set of label data including label text, label style information, and a range of zoom levels, wherein each label reference is associated with a map feature having a geographic feature type, including determining the label style information and the range of zoom levels from the type table according to the geographic feature type for the map feature associated with the label reference;

wherein the label data corresponding to the map data request is generated by obtaining a label reference associated with the map feature included in the map data request and retrieving the label data from the data structure using the label reference.

7. A computing device comprising:

a communication interface;

a user interface;

one or more processors coupled to the communication interface and the user interface; and a non-transitory computer-readable memory coupled to the one or more processors and storing thereon instructions that, when executed by the one or more processors, cause the computing device to:

receive, via the user interface, an instruction to display map data at a given zoom level, transmit a message requesting map data to a server via the communication interface, receive, from the server, map data including map vector data for map features and label data including label text, receive, from the server, first label style information, a first range of zoom levels, and instructions to apply the first label style information to the label text at the first range of zoom levels, wherein the first range of zoom levels includes the given zoom level, and wherein style information includes at least one of: a font type, a font size, or a font color, display the map vector data and the label text from the selected label data using the first label style information for the given zoom level in accordance with the instructions for the first range of zoom levels, receive, via the user interface, an instruction to display the map data at a second zoom level within the first range of zoom levels, display the map vector data and the label text from the selected label data using the first label style information for the second zoom level in accordance with the instructions for the first range of zoom levels, receive, via the user interface, an instruction to display the map data at a third zoom level outside of the first range of zoom levels, receive, from the server, second label style information, a second range of zoom levels, and instructions to apply the second label style information to the label text at the second range of zoom levels, wherein the second range of zoom levels includes the third zoom level, and wherein the second label style information is different from the first label style information, display the map vector data and the label text from the selected label data using the second label style information for the third zoom level in accordance with the instructions for the second range of zoom levels, receive via the user interface, an instruction to display the map data at a fourth zoom level within the second range of zoom levels, and display the map vector data and the label text from the selected label data using the second label style information for the fourth zoom level in accordance with the instructions for the second range of zoom levels.

8. A non-transitory computer-readable medium storing instructions for displaying map label data across a range of zoom levels that, when executed by one or more processors in a client device, cause the client device to:

receive, via a user interface on the client device, an instruction to display map data at a given zoom level, transmit a message requesting map data to a server via the communication interface, receive, from the server, map data including map vector data for map features and label data including label text, receive, from the server, first label style information, a first range of zoom levels, and instructions to apply the first label style information to the label text at the first range of zoom levels, wherein the first range of zoom levels includes the given zoom level, and wherein style information includes at least one of: a font type, a font size, or a font color, display the map vector data and the label text from the selected label data using the first label style information for the given zoom level in accordance with the instructions for the first range of zoom levels, receive, via the user interface, an instruction to display the map data at a second zoom level within the first range of zoom levels, display the map vector data and the label text from the selected label data using the first label style information for the second zoom level in accordance with the instructions for the first range of zoom levels, receive, via the user interface, an instruction to display the map data at a third zoom level outside of the first range of zoom levels, receive, from the server, second label style information, a second range of zoom levels, and instructions to apply the second label style information to the label text at the second range of zoom levels, wherein the second range of zoom levels includes the third zoom level, and wherein the second label style information is different from the first label style information, display the map vector data and the label text from the selected label data using the second label style information for the third zoom level in accordance with the instructions for the second range of zoom levels, receive, via the user interface, an instruction to display the map data at a fourth zoom level within the second range of zoom levels, and display the map vector data and the label text from the selected label data using the second label style information for the fourth zoom level in accordance with the instructions for the second range of zoom levels.

9. The computer-readable medium of claim 8, wherein the label data includes a plurality of label data, each of the plurality of label data covering a separate range of zoom levels.

10. The computer-readable medium of claim 8, wherein the instructions further cause the client device to request the second label style information from the server when the third zoom level is outside the first range of zoom levels and the second label style information is not available at the client device.

11. The computer-readable medium of claim 8, wherein each map feature comprises a rank specifying a relative order in which to add label text until a threshold of label text is displayed.

12. The computer-readable medium of claim 8, wherein to transmit the message requesting the map data, the instructions cause the client device to transmit an identifier for a mapping application associated with the message and the label data includes label data applicable only to features supported by the mapping application.

* * * * *